US011080563B2

(12) United States Patent
Guruprasad et al.

(10) Patent No.: US 11,080,563 B2
(45) Date of Patent: Aug. 3, 2021

(54) SYSTEM AND METHOD FOR ENRICHMENT OF OCR-EXTRACTED DATA

(71) Applicant: Infosys Limited, Bangalore (IN)

(72) Inventors: Shreyas Bettadapura Guruprasad, Bengaluru (IN); Radha Krishna Pisipati, Hyderabad (IN)

(73) Assignee: INFOSYS LIMITED, Bangalore (IN)

( * ) Notice: Subject to any disclaimer, the term of this patent is extended or adjusted under 35 U.S.C. 154(b) by 63 days.

(21) Appl. No.: 16/446,372

(22) Filed: Jun. 19, 2019

(65) Prior Publication Data

US 2020/0005089 A1    Jan. 2, 2020

(30) Foreign Application Priority Data

Jun. 28, 2018  (IN) .............................. 201841024115

(51) Int. Cl.
*G06K 9/62* (2006.01)
*G06N 20/00* (2019.01)

(52) U.S. Cl.
CPC .......... *G06K 9/6262* (2013.01); *G06N 20/00* (2019.01); *G06K 2209/01* (2013.01)

(58) Field of Classification Search
CPC combination set(s) only.
See application file for complete search history.

(56) References Cited

U.S. PATENT DOCUMENTS

| | | | |
|---|---|---|---|
| 6,456,738 B1 | 9/2002 | Tsukasa | |
| 8,676,731 B1 | 3/2014 | Sathyanarayana et al. | |
| 8,719,197 B2 | 5/2014 | Schmidtler et al. | |
| 10,049,096 B2 | 8/2018 | Deepak et al. | |
| 2007/0050360 A1* | 3/2007 | Hull | G06K 9/348 |
| 2007/0230787 A1* | 10/2007 | Belitskaya | G06K 9/723 |
| | | | 382/182 |
| 2010/0246999 A1* | 9/2010 | Tillberg | G06K 9/033 |
| | | | 382/309 |
| 2012/0128251 A1* | 5/2012 | Petrou | G06K 9/00456 |
| | | | 382/182 |
| 2012/0134590 A1* | 5/2012 | Petrou | G06K 9/00483 |
| | | | 382/182 |

(Continued)

OTHER PUBLICATIONS

Extended European Search Report received in counterpart European Patent Application No. 19182818.5, dated Nov. 20, 2019, 7 pages.

*Primary Examiner* — Omar S Ismail
(74) *Attorney, Agent, or Firm* — Troutman Pepper Hamilton Sanders LLP (Rochester)

(57) ABSTRACT

A computer implemented a method and system for enrichment of OCR extracted data is disclosed comprising of accepting a set of extraction criteria and a set of configuration parameters by a data extraction engine. The data extraction engine captures data satisfying an extraction criteria using the configuration parameters and adapts the captured data using a set of domain specific rules and a set of OCR error patterns. A learning engine generates learning data models using the adapted data and the configuration parameters and the system dynamically updates the extraction criteria using the generated learning data models. The extraction criteria comprise one or more extraction templates wherein an extraction template includes one of a regular expression, geometric markers, anchor text markers and a combination thereof.

19 Claims, 3 Drawing Sheets

(56) References Cited

U.S. PATENT DOCUMENTS

| | | | | |
|---|---|---|---|---|
| 2014/0355836 A1* | 12/2014 | Kozitsky | ............... | G06K 9/685 |
| | | | | 382/105 |
| 2015/0278593 A1* | 10/2015 | Panferov | ............ | G06K 9/00483 |
| | | | | 382/182 |
| 2015/0339536 A1* | 11/2015 | Lin | ........................ | G06K 9/228 |
| | | | | 382/182 |
| 2016/0371246 A1* | 12/2016 | Deepak | ................ | G06F 40/186 |
| 2017/0262723 A1* | 9/2017 | Kozitsky | .............. | G06K 9/6267 |

\* cited by examiner

| Extracted Character | ... | l | ... | - | ... | 1 | ... |
|---|---|---|---|---|---|---|---|
| True Character | | | | | | | |
| ... | | | | | | | |
| I | | 0.5 | | 0.3 | | 1 | |
| ... | | | | | | | |
| L | | 0.15 | | 0.6 | | 0.15 | |
| ... | | | | | | | |
| 1 | | | | | | 0.2 | |
| ... | | | | | | | |

FIGURE. 2

SYSTEM AND METHOD FOR ENRICHMENT OF OCR-EXTRACTED DATA

FIELD

The field relates to building a knowledge base for document imaging and discovering meaningful patterns from OCR extracted data to enrich the data and in turn improve the accuracy of the field values.

BACKGROUND

Organizations process large number of documents of different formats and populate the data into databases on a regular basis. The text in the document images is extracted using Optical Character Recognition (OCR) tools. The extracted text data can be composed of alphanumeric and other characters. Templates are created to arrive at the structure of image document for extraction of data fields, and the correctness of data is determined based on defined regular expressions. However, due to uncertainty involved in the document content representation, the extracted data sometime results in noise, and hence the accuracy of OCR extraction is limited. Reconstructing the original text (forward correction) for such noisy data is a challenging task. Moreover, updating an existing template and regular expressions according to the previous errors/corrections (backward correction) is tedious.

Existing solutions extract the data by defining a template, which in turn is used as the input to the OCR software. These solutions use confidence values provided by OCR and present to the end user using custom built user interfaces. The end user can correct the values in case the text is misrecognized by the OCR.

The text extracted from OCR is based on the template. Any change in the document structure results in misrecognition or partial recognition of various fields' data. Moreover, the document characteristics such as font, layout, new characters etc. change very often and hence the prebuilt and fixed templates are unable to provide accurate data extraction over time. Accuracy of capture and recognition is dependent on the person who is configuring the template. There is no generic procedure to automatically extract the data when there is a change in the layout.

Each OCR software provides different ways of computing the confidence parameter, which is internal to the OCR, and there is often no way to know that procedure. Hence, complete dependency on the OCR confidence value may not result in correctly classifying the error data.

Further, based on the threshold, if the custom application does not detect an error, the error is propagated into the enterprise database without noticing it explicitly. This can cause adverse impact.

SUMMARY

In a preferred embodiment, a method and system for enrichment of OCR extracted data is disclosed comprising accepting a set of extraction criteria and a set of configuration parameters by a data extraction engine. The data extraction engine captures data satisfying an extraction criteria using the configuration parameters and adapts the captured data using a set of domain specific rules and a set of OCR error patterns. A learning engine generates learning data models using the adapted data and the configuration parameters and the system dynamically updates the extraction criteria using the generated learning data models.

In another embodiment the extraction criteria comprise one or more extraction templates wherein an extraction template includes one of a regular expression, geometric markers, anchor text markers and a combination thereof.

In one embodiment the data adapter is configured to detect OCR errors based on a set of predefined error patterns in the received data.

In one embodiment the learning engine is configured to determine a probability of misrecognition of the extracted data using the learning data.

In one embodiment the data adapter is configured to capture a set of historical datasets.

In one embodiment the historical dataset comprises a ground truth data and OCR extracted data for each field.

In one embodiment the data adapter generates an OCR confidence value for each field value.

A learning module can generate a decision matrix using the OCR confidence value and the ground truth data.

BRIEF DESCRIPTION OF THE DRAWINGS

The various embodiments will hereinafter be described in conjunction with the appended drawings, provided to illustrate, and not to limit, the technology, wherein like designations denote like elements, and in which:

FIG. 2 illustrates a sample confusion matrix.

DETAILED DESCRIPTION

Figure 1:
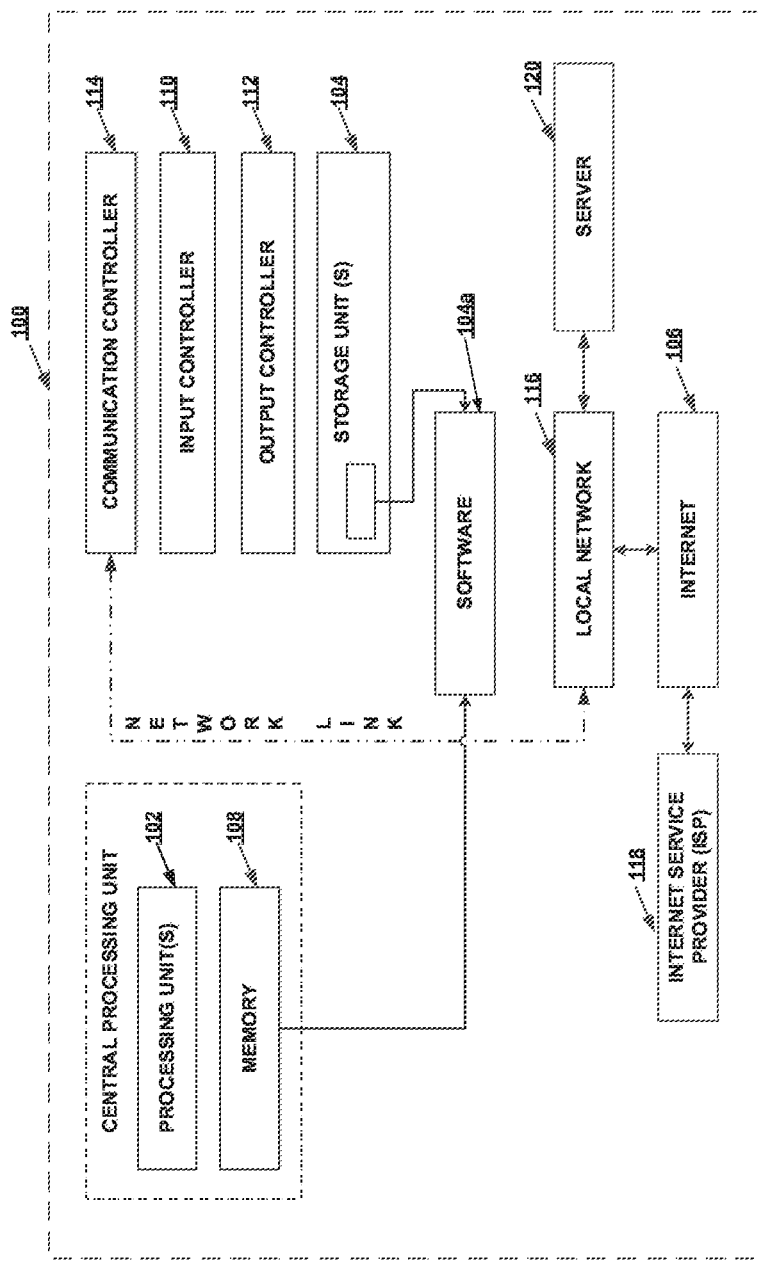
FIG. 1 illustrates a system in which various embodiments may be practiced, in accordance with an embodiment.

The technology aims to build a knowledge base for document imaging and discovering meaningful patterns from OCR extracted data to enrich the data and in turn improve the accuracy of the field values. The technology can carry out error correction for both forward correction and backward correction. The techniques include soft matches, n-gram models, Heuristics, approximation models, etc. The extracted patterns facilitate building accurate reconstructing of text.

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternative falling within the spirit and the scope of the invention as defined by the appended claims.

The method steps have been represented, wherever appropriate, by conventional symbols in the drawings, showing only those specific details that are pertinent to understanding the embodiments of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, method that comprises a list of steps does not include only those steps but may include other steps not expressly listed or inherent to such process, method. Similarly, one or more elements in a system or apparatus proceeded by "comprises . . . a" does not, without more constraints, preclude the existence of other elements or additional elements in the system or apparatus.

The features of the present invention are set forth with particularity in the appended claims. The invention itself, together with further features and attended advantages, will become apparent from consideration of the following detailed description, taken in conjunction with the accompanying drawings.

This application is related to U.S. patent application publication no. US20160371246A1 titled "System and method of template creation for a data extraction tool" which is filed herewith, and which is incorporated herein by reference in its entirety.

FIG. 1 is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid-state storage device and a non-transitory storage device. The storage device 104 may contain software 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110, output controller 112, and any other devices (e.g., network controllers, sound controllers, etc.). Output controller 112 may be operatively coupled (e.g., via a wired or wireless connection) to a display device (e.g., a monitor, television, mobile device screen, touch-display, etc.) in such a fashion that output controller 112 can transform the display on display device (e.g., in response to modules executed). Input controller 110 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

The technology proposes learning approaches for data extraction and enrichment. A platform built for data extraction and enrichment built to automate document processing such as invoices, pay order, loan forms, etc. stands to benefit immensely from the learning mechanism proposed in the following sections. Such a platform is composed of several modules such as OCR Extraction, Header Validation, PO-Line Item mapping, GL Coding, etc. During the processing of a document (ex., invoice), these modules take one or more decisions based on certain assumptions. For example, can we consider a vendor name, extracted by the OCR extractor with a confidence of 58%, accurate? In this case, the underlying assumption, made by the system, is that if a vendor name is extracted with X % confidence then it can be assumed to be accurate for that decision point. Initially, assumptions or human understanding define the value of X. One of the goals of the technology is to predict the accurate value of X that will increase the efficiency of the decision-making capabilities of the system.

Learning requires data, including past data on the performance of the system. The learning system proposed here is designed to log data at each decision point, along with the extracted data, and ground truth. Below we describe Optimal Threshold Determination.

In one embodiment, a domain may include a subject matter topic. Domain specific rules can be used for extraction of data from a document. For all documents the correct logical structure and the domain specific layout primitives (e.g. invoice no, date, etc.) are predefined. During analysis of a plurality of documents, the system generates new domain vocabulary which is stored in a repository.

In one embodiment, a min-max approach is described. A matrix is derived for correct match and mismatch cases for a field (ex. invoice number):

TABLE 1

|                    | Match: X | Mismatch: Y |
|--------------------|----------|-------------|
| Maximum Confidence | 100      | 71          |
| Minimum Confidence | 12       | 22          |

$$\text{Threshold } Th = \underset{Th}{\operatorname{argmax}}(f(X, Y))$$

Where f(X,Y) is a function of X and Y. Any regression function can be used, however, due to less number of features availability, optimal threshold can be computed as, $$\text{Threshold } Th = \underset{Th}{\operatorname{argmax}}(f(X, Y))$$
$$= \underset{Th}{\operatorname{argmax}}((\text{Min}Conf(X) - 1, \text{Max}Conf(Y) + 1)$$

For example data, Threshold=71+1=72

Invoice Number: 72 and above Green, otherwise Red

Similarly, for PO Number: 70 and above Green, otherwise Red

In order to extract text from Image documents (e.g., scanned document, Photo of a document taken from a camera, etc.), OCR tools are used. There is always a possibility of some characters being wrongly extracted by OCR engine like i as I, and r and n as m etc. Usually, OCR engines are build using Machine Learning techniques, and when they extract text from documents, they provide some confidence of extraction of the text (for each character, for each word, etc.). For example, an invoice number 1234 is extracted with a confidence of 87%. That is, OCR is 87% confident in extracting that value correctly. However, the correctness (i.e., match or mismatch) of the value is determined once we check with the actual document (i.e., ground truth).

In one embodiment, in order to arrive an optimal threshold to determine the extraction correctness, the threshold indicates Green, which indicates developed system has trust on the extracted values so that the user (data entry person) need to check for its accuracy; and below the threshold means Red, that mean user has to look at the document and verify whether it is extracted correctly or not. In this case, an example of extraction is key-value pairs, for instance, Invoice Number –1234, here key is invoice number and value is 1234. Key is what needs to be extracted, and value is the corresponding value in the document that represents the key. In the scenario where it is required to extract invoice number from 100 invoices (training data), the OCR confidence for each invoice for the field invoice number can be used. Also, upon lookin at the actual document, it is known whether invoice number from the document is extracted correctly or not. That means, now there are two values associated with invoice number: (i) OCR confidence obtained from OCR engine, and (ii) match/mismatch information from ground truth. Using these values, a decision matrix is framed as below:

TABLE 2

|  | Match: X | Mismatch: Y |
| --- | --- | --- |
| Maximum Confidence | 100 | 71 |
| Minimum Confidence | 12 | 22 |

Match is denoted as X and Mismatch is denoted as Y. Out of a sample number of 100 invoices, some are matched correctly and others are not. From the matched samples, the values of maximum and minimum confidences provided by the OCR engine are extracted. Similarly, for the Mismatch samples the values of maximum and minimum confidences provided by the OCR engine are extracted. From these values, the above decision matrix is formed, and is used as input to the expression.

$$\text{Threshold } Th = \underset{Th}{\text{argmax}}(f(X, Y))$$
$$= \underset{Th}{\text{argmax}}((\text{MinConf}(X) - 1, \text{MaxConf}(Y) + 1)$$

Arg max indicates the arguments of the maxima. That is, these are the points of the domain of some function at which the function values are maximized. In the above, the function considered is f(X, y)—that is two parameters X and Y, where $X$ is MinConf($X$)−1 and $Y$ is MaxConf($Y$)+1

From the above matrix, the minimum confidence of match cases is 12, and maximum confidence of mismatches cases is 71. So the values of MinConf(Match)−1=11 and MaxConf (Mismatch)+1=72. Out of these two values argmax, that is maximum of both two, is 72. So, based on the given training data, the threshold is set as 72.

In this scenario, for a new document, when invoice number field is extracted by OCR and OCR gives confidence above 72, it is marked as green, else it is marked red.

The input to this approach is training data with OCR confidence values and match/mismatch information. The data adapter is configured to generate an OCR confidence value for each field value. The output is the optimal threshold value. This is called as model building, and this model is used when new samples arrived. Based on the threshold value, it is determined whether an extracted field value is to be marked as Green or Red.

For the following approach, the computation of optimal threshold is different from above. The above approach uses decision matrix and the argmax function to determine optimal threshold. In the following approach, it uses a cost function. Here, negative cases are treated as mismatch cases.

Edit distance is applied on two strings to know how close they are. To determine error in the extraction of a field, one can use edit distance between the actual text (string) and the extracted text. Suppose, in one invoice (with case id 19084), the actual text on the invoice document for invoice number is a235fg871. It has 9 characters. Suppose, OCR engine extracted this text as a235fo891. That is, g is misplaced as o. Edit distance works on number of operations to convert one string to another. So, the number of operations to transform extracted invoice number to actual invoice number is 1 (as there is one character replacement). So, the error cost is 1−(9−1)/9=0.12. For this field, OCR engine gives its confidence value. This is for one invoice. In the training data, we have 100 samples (for instance). So, we compute optimal threshold using the formula $$\text{Optimal Threshold } Th = 100 - \frac{\sum (\beta * E_N)}{\sum E_N}$$

So, the input to this approach is, training data with OCR confidence, extracted text and ground truth. The case id is equivalent to serial number for the invoices in the training data.

In another embodiment, error cost estimation for negative case is described. The mathematical formula for error cost estimation is $$E_N = 1 - \frac{(n - e)}{n}$$

Where n is the total number of characters, and e is the error involved. Here, "e" may be computed using, for example, an edit distance or any other function. In the present case, we can consider it as number of characters mismatched.

The optimum threshold is defied using the formula $$\text{Optimal Threshold } Th = 100 - \frac{\sum (\beta * E_N)}{\sum E_N}$$

where β is the OCR confidence.

In one embodiment, for a sample data shown below, with an OCR confidence β for Invoice number as 71% and for part number as 22%,

TABLE 3

| Case ID | Field Name | Extracted Text | Ground truth | No. of characters (n) | No. of character positions mismatched (e) | Comments |
|---|---|---|---|---|---|---|
| C1 | Invoice Number | SGE-23984 | SGE-28984 | 9 | 1 | Character 8 is extracted as 3 |
| C2 | Part Number | S1367I334I929 | 5136713341929 | 13 | 3 | Character 5 is extracted as 'S' and Character 1 is extracted as 'L' at $6^{th}$ and $10^{th}$ positions of the string. | a. Error Cost of case ID C1=1−(9−1)/9=1−0.88=0.12
b. Error Cost of case ID C2=1−(13−3)/13=1−0.76=0.24
c. Th=100−[((71*0.12)+(22*0.24))/(0.12+0.24)]=100−38.33=61.67

Further, if we want to have three states namely Green, Yellow and Red, we can include tolerance limit t (say 3%), and consider Th+τ to Th−τ as Yellow.

The selection of the approaches is based on the size and nature of the training data for learning purpose.

In yet another embodiment, confusing characters for OCR are described. OCR tools are known to confuse between similarly looking characters (e.g, i, 1, I). In order to arrest the scenario, a confusion matrix may be generated for each field and for each vendor, that reflects the probability of a given character to be incorrectly extracted as another character. Table 4 is a sample matrix as shown below.

TABLE 4

|  | Extracted Character | | | | | | |
|---|---|---|---|---|---|---|---|
| True Character | ... | i | ... | I | ... | 1 | ... |
| ... I ... | | 0.5 | ... | 0.3 | ... | 0.15 | ... |
| ... L | | 0.15 | | 0.6 | | 0.2 | |
| ... 1 ... | | | | | | | |

The probability values for the confusion matrix entries are extracted using the frequency of the observed values against the ground truth. The confusion matrix generation is also extended for 2-gram, 3-gram, . . . n-gram. The confusion matrix can have large dimensions but it is highly sparse and thus we store in a database in a compact form.

In one more embodiment, a non-threshold based approach to predict OCR extraction correctness is proposed. A predictive model is generated using machine learning techniques for learning based on parameters like, but not limited to, confidence values, confusion matrix, length of the string, type of field content, etc. for accurately predicting the correctness of the OCR extracted value. The model is further optimized by integrating it with business rules, heuristics, etc. as direct input to the model. The model is configured to generate visual articulation in the form of heat maps for various stakeholders.

FIG. 2 illustrates an overall Data Extraction and Enhancement Platform (DEEP) and the modules and interfaces of the Learning Component in the DEEP platform. Many components in the DEEP platform use techniques that may be improved by learning from past data. For example, in the extraction component, extraction of field values from invoices requires knowing where the field occurs in the invoice. By analyzing past data, common variations in the field location may be learnt, making the extraction of field values more accurate.

The learning engine has two aspects. In one embodiment data exploration by the learning component is described. The learning component captures data from different sources namely Master Data/Transaction data, Learning Log files and OCR output. The learning engine then analyzes them to provide numerical and visual summaries of the system's performance in terms of parameters such as, but not limited to, accuracy of field recognition. This analysis is used to identify key variables, commonly occurring problems, outliers, parts of the system that have problems and parts that can be improved. The analysis also helps in identifying dependencies amongst variables, if any.

In another embodiment component-specific knowledge generation is described. The learning engine analyzes generated learning data to identify problems at the component level that can be solved using standard statistical techniques and machine learning tools. Component refers to module or service in the overall system. Different components are described in subsequent sections. The component level knowledge thus generated is used by corresponding DEEP components after the data collection for providing Learning information service.

Figure 3:
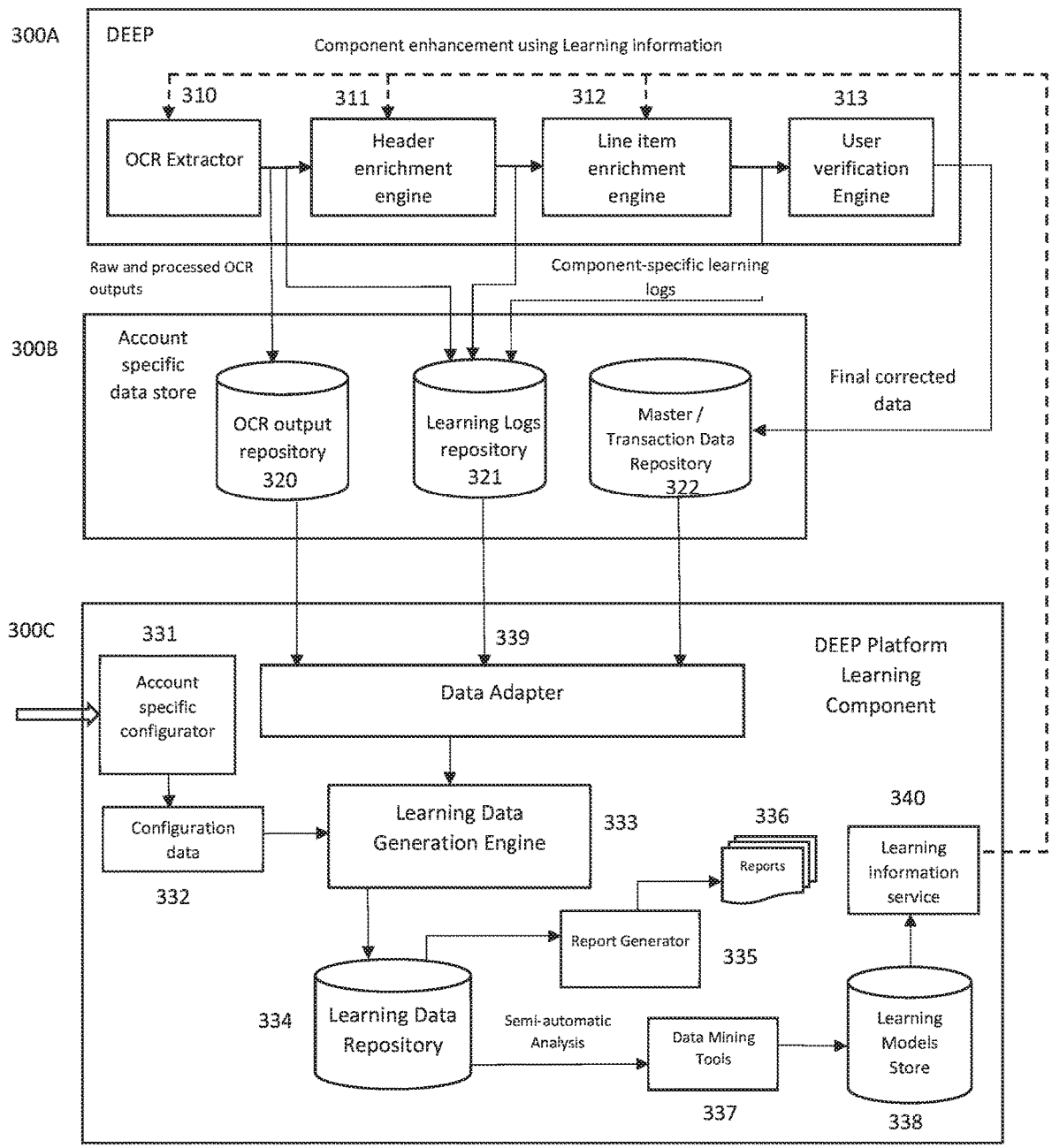
FIG. 3 illustrates the overall DEEP system.

FIG. 3 describes the overall DEEP system. It comprises three components namely DEEP platform components responsible for document processing (300A), account-specific (or client-specific) data store (300B), and DEEP Platform learning component (300C).

In one embodiment the OCR extractor (310) is configured to extract and store the outputs generated by the OCR extraction process. The header enrichment engine (311) and the line item enrichment engine (312) are configured to store logs about decisions made in the components. The header enrichment engine is further configured to generate a header configuration file that contains information about decisions made regarding the correctness of field values for each field in a document, e.g., invoice.

In another embodiment, line Items describe the details about items/products like Line number, part number description, quantity, unit price and amount in an invoice document. These line items are usually represented in the form of a table, where each row corresponds to one specific item, and columns represent the attributes describing the item details (e.g., Line number, part number description, quantity, unit price and amount). The Line Item Enrichment engine extracts attribute values for each item details, enrich those values and generate a line item configuration file with these enriched data. Such a configuration file generated may be in an xml file, a cfg file or any other known format of configuration file.

User Verification Engine (313) validates the extracted and enriched values obtained from header and line item enrichment components with the actual image data and knowledge learned, and finally updates the values.

In another embodiment the account-specific data store 300(B) is configured to store multiple forms of information. Output information generated by the OCR extraction engine (311) is stored in an OCR output repository (320). It may be noted that various OCR engines may be used and in specific cases raw output file and result output file may also be stored. The learning logs repository (321) stores the Learning files generated by individual components in the DEEP platform (for example, the header.xml file described above). The master/transaction data repository (322) stores the Master data. The master data may comprise of set of values of invoice fields that have been verified to be correct.

In one embodiment, the data may be acquired by the learning engine (300C) using a data adapter (339) and the account-specific configurator (331). The data adapter is configured to accept a set of predefined extraction criteria and a set of parameters as provided in the configuration file for acquiring the data. The data adapter is configured to capture a set of historical datasets comprising of ground truth data as provided in Table 3 and OCR extracted data for each field. The extraction criteria may comprise a set of preformatted and predefined extraction templates like, but not limited to, one of a regular expression, geometric markers, anchor text markers etc. The data adapter captures data when the extraction criteria is satisfied based on the configuration parameters. This acquired data may be stored in a database or in a file system.

The learning component comprises of the data adapter (339) and account-specific configurator (331). In one embodiment the data adapter and the account specific configurator may comprise an Interface component. The account-specific configurator is used to specify the fields that have to be analyzed, the locations of the data stores and other information relevant for accessing data (for example, database login credentials) and where the output of learning component has to be stored. The information may be directly entered through a configuration file or a user-interface may be provided to get the data from the user.

In another embodiment the data adapter contains code to capture data of known structures from the locations and login credentials specified in the account specific configuration file. This is provided to the learning data generation engine (333). The data adapter is configured to modify and adapt the captured data using the set of domain specific rules and a set of predefined OCR error patterns. The OCR error patterns are generated through a set of historical data available to the system and is provided as a predefined input to the data adapter. OCR patterns are generated using pattern-recognition principles applied, over a long term, to domain specific rules for different context types of electronic bit-map portions so that, for example, a new character may be validated as it more frequently appears for the same geographical area among many similar characters situated within that area. Prior errors that have been flagged as possible may be eventually reclassified as valid and the error corrected in analysis of newly encountered characters.

In one embodiment, the learning data generation engine (333) uses the data provided by the data adapter (339) and the configuration file to generate learning data models in the form of tables, and stores them in the database as specified in the configuration file.

The captured information that is used to evaluate the performance of the DEEP platform, is stored in the learning data repository (334). The captured information is used to identify problems in the components. The information is stored in the form of tables in the learning data repository for the step of evaluation.
 i. FieldObservations: this table stores extracted and expected values for different fields in each invoice (as specified in the configuration file)
 ii. FieldAccuracy: this table stores information about the accuracy of different fields
 iii. FieldConfusion: this table stores the confusion matrix for each field (the confusion between the expected characters in a field and the extracted characters in that field are stored)
 iv. FieldThreshold: this table stores a recommended threshold for a field based on the correlation between the OCR confidence level for a field and the correctness of the field decided subsequently.

In another embodiment a Report generator (335) helps in data exploration as explained above. The report generator analyzes the tabular data in the learning data repository and generates reports (336) containing numeric or visual summaries of the data. The data analysis comprises data mining and report generation.

In one embodiment learning data tables are processed by the data mining tools (337) to identify useful patterns that may be used to improve DEEP platform components. The utility and relevance of the learning models generated by the data mining tools is validated to complete the data analysis. Once validated, the learning models are stored in a data store (338), from where it may be used by DEEP platform components using learning information service (340). The Learning information service is adapted to dynamically update the extraction criteria and the header data using the generated learning data models. The updated criteria are taken as input by the OCR extractor and the Header enrichment engine in subsequent iterations to provide for better extraction of subsequently presented documents.

The learning component has an impact on multiple areas in the DEEP platform. deskilling and template creation. The Learning component can thus indicate the problems with regions of extraction for fields.

Enrichment of the OCR data provides the probability of characters that are misrecognizing, for each field. This can guide possible heuristics for field-level validations and thus improve confidence in the deployment of DEEP. The learning component provides inputs on fields that are extracted correctly most of the time through OCR. This leads to increased confidence in the usage of DEEP platform for data extraction from relevant documents.

Other Embodiments

Any of the following can be implemented:
Clause 1. A system for enrichment of OCR extracted data, comprising:
 a data extraction engine configured to:
 accept a set of extraction criteria and a set of configuration parameters;
 capture data satisfying the extraction criteria using the configuration parameters; and
 adapt captured data using a set of domain specific rules and a set of OCR error patterns; and a learning engine configured to generate learning data models using the adapted data and the configuration parameters;

wherein the extraction criteria are dynamically updated using the generated learning data models.

Clause 2. The system of Clause 1, wherein the extraction criteria comprises one or more extraction templates.

Clause 3. The system of Clause 2 wherein at least one of the extraction templates includes a regular expression, geometric markers, anchor text markers, or a combination thereof.

Clause 4. The system of any of Clauses 1-3 further comprising:

a data adapter configured to detect OCR errors based on a set of predefined error patterns.

Clause 5. The system of any of Clauses 1-4 wherein the learning engine is configured to determine a probability of misrecognition of the extracted data using the learning data models.

Clause 6. The system of any of Clauses 1-5 further comprising:

a data adapter configured to capture a set of historical datasets.

Clause 7. The system of Clause 6, wherein at least one of the historical datasets comprises a ground truth data and OCR extracted data for each field.

Clause 8. The system of any of Clauses 1-7, further comprising:

a data adapter configured to generate an OCR confidence value for each field value.

Clause 9. The system of any of Clauses 1-8 wherein at least one of the learning data models generates a decision matrix using an OCR confidence value and ground truth data.

Clause 10. A method for enrichment of OCR extracted data, comprising accepting a set of extraction criteria and a set of configuration parameters by a data extraction engine;

capturing data satisfying an extraction criteria using the configuration parameters by a data extraction engine;

adapting captured data using a set of domain specific rules and a set of OCR error patterns by a data extraction engine;

generating learning data models using the adapted data and the configuration parameters by a learning engine; and dynamically updating the extraction criteria using the generated learning data models.

Clause 11. The method of Clause 10 wherein the extraction criteria comprises one or more extraction templates.

Clause 12. The method of Clause 11 wherein at least one of the extraction templates includes a regular expression, geometric markers, anchor text markers, or any combination thereof.

Clause 13. The method of any of Clauses 10-12 further comprising:

detecting OCR errors based on a set of predefined error patterns.

Clause 14. The method of any of Clauses 10-13 wherein the learning engine is configured to determine a probability of misrecognition of the extracted data using the learning data models.

Clause 15. The method of any of Clauses 10-14 further comprising:

capturing a set of historical datasets.

Clause 16. The method of Clause 15 wherein the historical dataset comprises a ground truth data and OCR extracted data for each field.

Clause 17. The method of any of Clauses 10-16 further comprising:

generating an OCR confidence value for each field value.

Clause 18. The method of any of Clauses 10-17 further comprising:

generating a decision matrix using an OCR confidence value and ground truth data.

Clause 19. One or more non-transitory computer-readable media having encoded thereon computer-executable instructions that, when executed, cause a computing system to perform the method of any of the Clauses 10-18.

Clause 20. One or more non-transitory computer-readable media having encoded thereon computer-executable instructions that, when executed, cause a computing system to perform a method of enriching OCR extracted data, the method comprising:

accepting a set of extraction criteria and a set of configuration parameters;

capturing data satisfying an extraction criteria using the configuration parameters;

adapting captured data using a set of domain specific rules and a set of OCR error patterns;

generating learning data models using the adapted data and the configuration parameters; and dynamically updating the extraction criteria using the generated learning data models.

Further Description

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A system for enrichment of OCR extracted data, the system comprising:
    memory comprising programmed instructions stored thereon and one or more processors configured to be capable of executing the stored programmed instructions to:
    accept a set of extraction criteria and a set of configuration parameters;
    capture data satisfying the extraction criteria using the configuration parameters;
    adapt captured data using a set of domain specific rules and a set of OCR error patterns; and
    generate one or more learning data models using the adapted data and the configuration parameters, wherein the generated learning data models are further optimized based on a confusion matrix where probability values are extracted using a frequency of observed values against ground truth and the confusion matrix is extended for one or more n-grams;
    wherein the extraction criteria are dynamically updated using the generated learning data models.

2. The system of claim 1, wherein the extraction criteria comprises one or more extraction templates.

3. The system of claim 2 wherein at least one of the extraction templates includes a regular expression, geometric markers, anchor text markers, or a combination thereof.

4. The system of claim 1 wherein the processors are further configured to be capable of executing the stored programmed instructions to:
    detect OCR errors based on a set of predefined error patterns.

5. The system of claim 1 wherein the processors are further configured to be capable of executing the stored programmed instructions to:
    determine a probability of misrecognition of the extracted data using the learning data models.

6. The system of claim 1 wherein the processors are further configured to be capable of executing the stored programmed instructions to:
    capture a set of historical datasets.

7. The system of claim 6, wherein at least one of the historical datasets comprises a ground truth data and OCR extracted data for each field.

8. The system of claim 1, wherein the processors are further configured to be capable of executing the stored programmed instructions to:
    generate an OCR confidence value for each field value.

9. The system of claim 1 wherein at least one of the learning data models generates a decision matrix using an OCR confidence value and ground truth data.

10. A method for enrichment of OCR extracted data implemented by computing system comprising one or more computing devices, the method comprising:
    accepting a set of extraction criteria and a set of configuration parameters;
    capturing data satisfying an extraction criteria using the configuration parameters;
    adapting captured data using a set of domain specific rules and a set of OCR error patterns;
    generating one or more learning data models using the adapted data and the configuration parameters, wherein the generated learning data models are further optimized based on a confusion matrix where probability values are extracted using a frequency of observed values against ground truth and the confusion matrix is extended for one or more n-grams; and
    dynamically updating the extraction criteria using the generated learning data models.

11. The method of claim 10 wherein the extraction criteria comprises one or more extraction templates.

12. The method of claim 11 wherein at least one of the extraction templates includes a regular expression, geometric markers, anchor text markers, or any combination thereof.

13. The method of claim 10 further comprising:
    detecting OCR errors based on a set of predefined error patterns.

14. The method of claim 10 wherein the learning engine is configured to determine a probability of misrecognition of the extracted data using the learning data models.

15. The method of claim 10 further comprising: capturing a set of historical datasets.

16. The method of claim 15 wherein the historical dataset comprises a ground truth data and OCR extracted data for each field.

17. The method of claim 10 further comprising:
    generating an OCR confidence value for each field value.

18. The method of claim 10 further comprising:
    generating a decision matrix using an OCR confidence value and ground truth data.

19. A non-transitory computer readable medium having stored thereon instructions for enriching OCR extracted data comprising machine executable code which when executed by at least one processor, causes the processor to:
    accept a set of extraction criteria and a set of configuration parameters; capturing data satisfying an extraction criteria using the configuration parameters;
    adapt captured data using a set of domain specific rules and a set of OCR error patterns;
    generate one or more learning data models using the adapted data and the configuration parameters, wherein the generated learning data models are further optimized based on a confusion matrix where probability values are extracted using a frequency of observed values against ground truth and the confusion matrix is extended for one or more n-grams; and
    dynamically update the extraction criteria using the generated learning data models.

* * * * *